P. G. BLOT-GARNIER & G. P. CHEVALIER.
INDICATING OR RECORDING APPARATUS PARTICULARLY APPLICABLE TO MARINE LOGS.
APPLICATION FILED MAY 5, 1915.

1,296,947.

Patented Mar. 11, 1919.
7 SHEETS—SHEET 1.

WITNESSES

INVENTORS
Paul Georges Blot-Garnier
Gabriel Pierre Chevalier
BY
ATTORNEYS P. G. BLOT-GARNIER & G. P. CHEVALIER.
INDICATING OR RECORDING APPARATUS PARTICULARLY APPLICABLE TO MARINE LOGS.
APPLICATION FILED MAY 5, 1915.

1,296,947.
Patented Mar. 11, 1919.
7 SHEETS—SHEET 2.

P. G. BLOT-GARNIER & G. P. CHEVALIER.
INDICATING OR RECORDING APPARATUS PARTICULARLY APPLICABLE TO MARINE LOGS.
APPLICATION FILED MAY 5, 1915.

1,296,947.

Patented Mar. 11, 1919.
7 SHEETS—SHEET 5.

WITNESSES
G. V. Rasmussen
Henry Ruhl

INVENTORS
Paul Georges Blot-Garnier
Gabriel Pierre Chevalier
BY
ATTORNEYS

P. G. BLOT-GARNIER & G. P. CHEVALIER.
INDICATING OR RECORDING APPARATUS PARTICULARLY APPLICABLE TO MARINE LOGS.
APPLICATION FILED MAY 5, 1915.

1,296,947.

Patented Mar. 11, 1919.
7 SHEETS—SHEET 6.

WITNESSES:
G. V. Rasmussen
Henry Kuhl

INVENTORS
Paul Georges Blot-Garnier
Gabriel Pierre Chevalier
BY
ATTORNEYS

UNITED STATES PATENT OFFICE.

PAUL GEORGES BLOT-GARNIER AND GABRIEL PIERRE CHEVALIER, OF PARIS, FRANCE.

INDICATING OR RECORDING APPARATUS PARTICULARLY APPLICABLE TO MARINE LOGS.

1,296,947.       Specification of Letters Patent.        Patented Mar. 11, 1919.

Application filed May 5, 1915. Serial No. 25,882.

*To all whom it may concern:*

Be it known that we, PAUL GEORGES BLOT-GARNIER and GABRIEL PIERRE CHEVALIER, citizens of the Republic of France, and residents of city of Paris, 9 Rue Bendant, France, respectively, have invented certain new and useful Improvements in Indicating or Recording Apparatus Particularly Applicable to Marine Logs, of which the following is a specification.

This invention relates to indicating or recording apparatus actuated by difference of pressure between two different media or at two points of the same medium. The device is particularly intended for use with hydrodynamic logs of the kind wherein the speed of the vessel is ascertained from the difference between the pressure and the depression produced in the wake of the vessel.

The device of this invention is characterized by the combination of two chambers of variable capacity respectively connected to the two media of which it is desired to ascertain the difference of pressure, and of a return force serving to bring back the chambers to their initial capacity.

In the preferred forms the chambers, which comprise a movable partition, are so arranged or connected by a device in such manner that when the movable walls have left their position of equilibrium the indication given by the apparatus is proportional to the algebraical difference of the respective movements of the movable walls relatively to the intermediary or equilibrium position. This indication always corresponds to the difference of pressure between the two chambers and hence to that between the two media. Inasmuch as this difference, particularly in the case of the hydrodynamic log above referred to, may be alternatively positive or negative in value, the needle will travel in two opposite directions so that the zero occupies an intermediate position on the scale on which are read the displacements of the needle. The return force, acting in opposition to the variations in volumes of the chambers, is designed so as to be in equilibrium with respect to the pressures and depressions which may be produced in these chambers.

The device of this invention possesses the advantage of being very sensitive and it furthermore indicates or records accurately either positive or negative differences of pressure varying from a height of water of one centimeter up to a height of five meters and even above. Its employment is consequently particularly adapted for measuring the speed of travel of a ship deduced from the difference between the pressure and the depression produced in the wake in the hydrodynamic log.

The invention has also for its object to provide such indicating apparatus with a safety device which will serve to prevent the accidental intrusion of sea water into the chambers of the apparatus, such ingress of water taking place owing to the fact on the one hand that the apparatus is situated at a level beneath that which would be reached by a column of water at atmospheric pressure which actuates the apparatus and on the other hand to a leak taking place in the pneumatic conduit. This safety device is constituted essentially by a capacity interposed in front of the inlet of the pneumatic circuit of the apparatus into the medial channel of a conduit having the shape of a double swan's neck, this capacity being of a volume substantially equal to that of the chamber to be protected. Furthermore, the capacity is provided at its lower part with a valve of special construction by means of which any water which may find its way into the capacity may be discharged and enabling the communication between the capacity and the air inlet conduit to be interrupted.

In the accompanying drawings which illustrate different constructional forms of the apparatus, Fig. 11 is a section of the apparatus provided with the safety device. Fig. 12 is a section of the valve on line B—B of Fig. 13, while Figs. 12 to 17 are drawn to a larger scale than that of the remaining figures.

Figure 1:
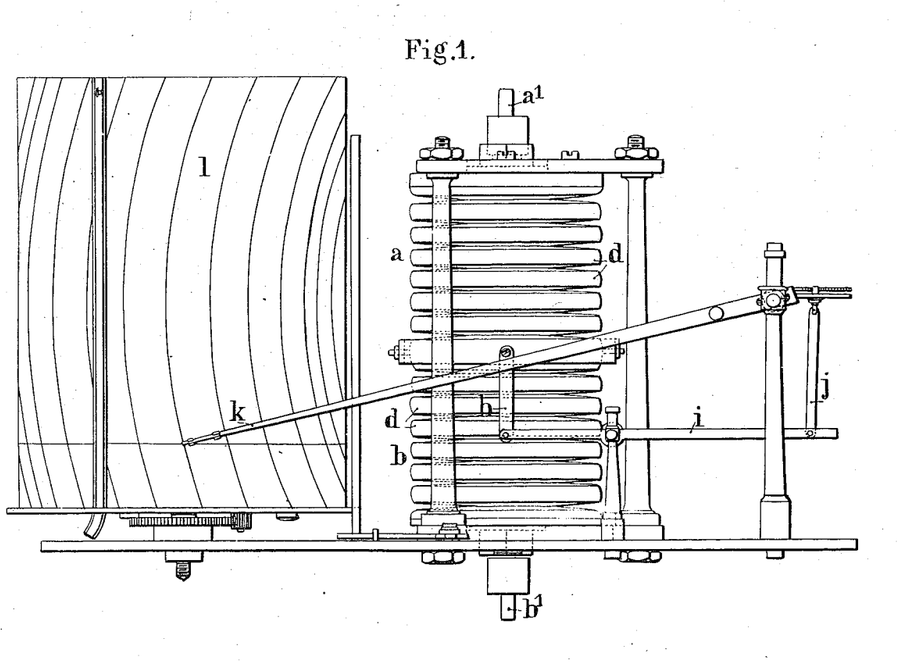
Figures. 1 and 2 are respectively an elevation and a plan and Fig. 3 a vertical section on line A—A, Fig. 2, of one form of the device.
Figure 2:
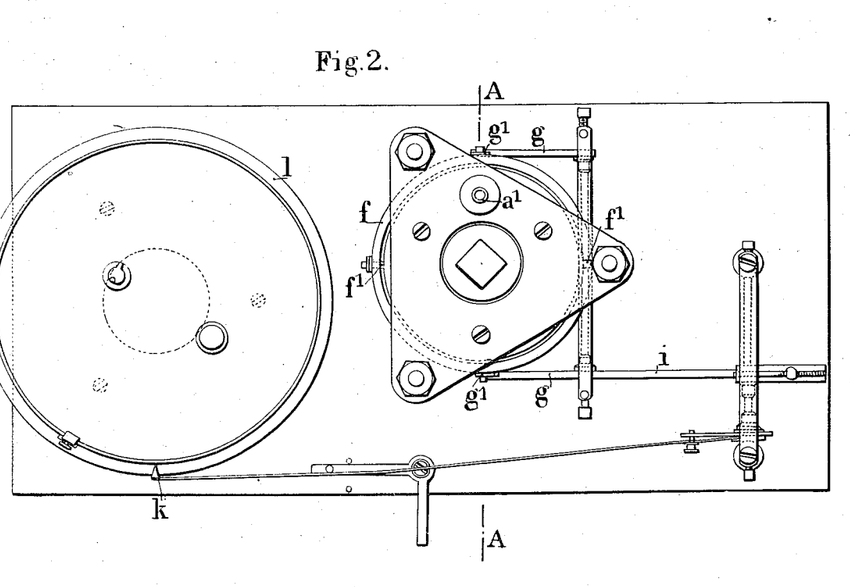
Figure 3:
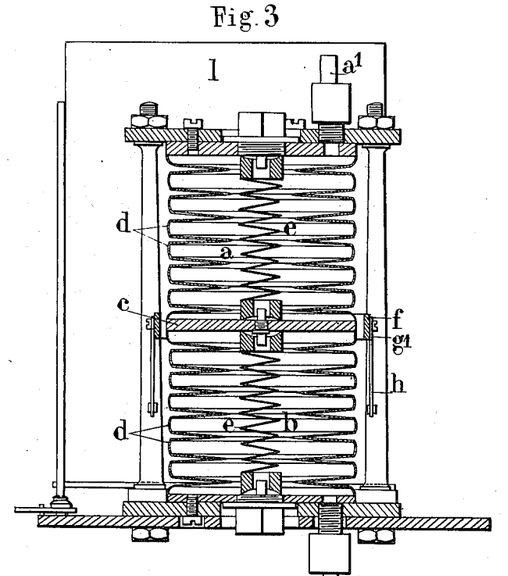

As will be seen in the construction shown in Figs. 1, 2 and 3, the apparatus comprises two chambers $a$ and $b$ mounted in juxtaposed position and separated by a common dividing wall $c$. Each of the chambers is constituted by an assemblage of deformable capsules $d$ similar to those used in an aneroid barometer. Two springs $e$, placed in opposition and under tension along the axis of the chambers, tend to maintain the movable dividing wall $c$ in its initial position. The power of the springs is so adjusted as to be in equilibrium relatively to the difference in maximum pressure which may be produced between the two chambers and their stroke is such that their effects are always in opposition even when the dividing wall is in either of its extreme positions.

$f$ is a ring mounted at $f^1$, $f^1$ on the wall $c$ and actuated thereby to move a fork $g$ by means of links $h$ pivoted at $g^1$, $g^1$ on an axis perpendicular to the axis $f^1$, $f^1$. On the fork is carried a lever $i$ which actuates through a link $j$ a recording needle $k$ adapted to move over the face of a recording drum $l$ of known construction. The chambers $a$ and $b$ are connected with the media of which the difference of pressure is to be ascertained by conduits $a^1$ and $b^1$ respectively.

The operation of the device is as follows:

When the pressure increases, say, in the lower chamber $b$ and decreases in the upper chamber $a$, the spring appertaining to the latter chamber is in opposition to the spring appertaining to the chamber $b$ against which it is normally in equilibrium and to a supplementary force equal to the difference of pressure between the two chambers. This spring will therefore bend up until such time as it will reach a position whereat it will be in equilibrium with these two forces. The movement of the wall $c$ is transmitted to the recording needle by means of the link assemblage $f$ and $g$ which prevents any errors in the indications given due to canting of the wall $c$ relatively to the axis of the chambers. By means of this arrangement, whatever be the inclination of the wall, the displacement of the needle will indicate the difference of the volume between the chambers.

Inasmuch as in a hydrodynamic log the amplitude of the displacements of the wall must be relatively great a small multiplying effect can be given to the levers actuating the needle, thus increasing the sweep of the inscribing arm relatively to the movements of the means actuating said arm.

As the area of the dividing wall between the chambers is the same on both of its surfaces, an equal increase or decrease of pressure in the two chambers has no influence on the indications given by the apparatus. In this apparatus the dividing wall possesses great stability and sensitiveness as it moves even with a difference of pressure equal to one gram per square centimeter. These two properties are due, the first to the fact that the two springs are in tension and in opposition and the second to the special slightly domed shape of the metal capsules, these being adapted to be submitted to initial tension without in anywise modifying the value of their deformation constants in the direction of their axis.

Figure 4:
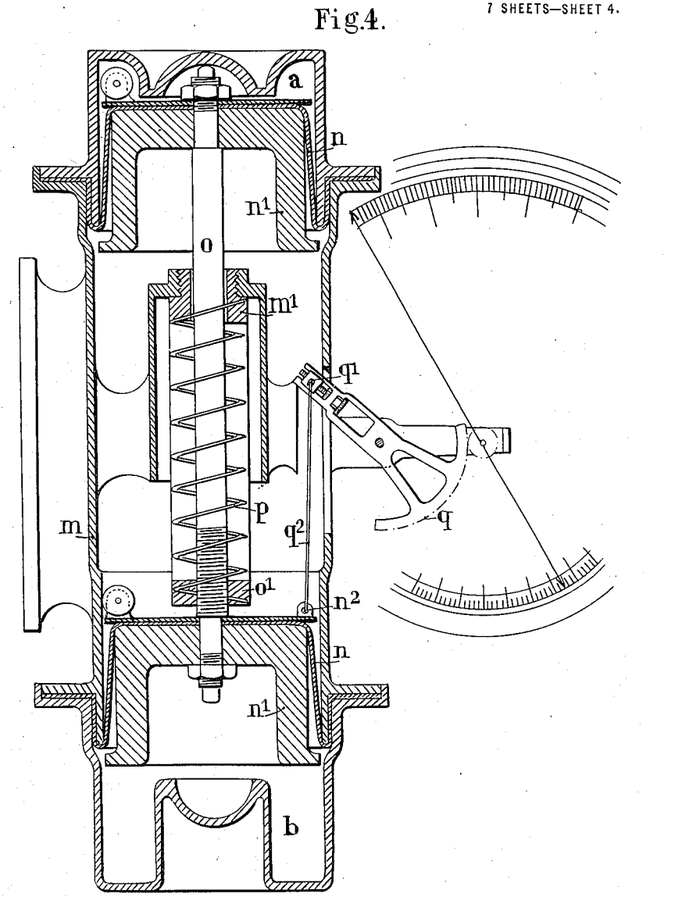
Fig. 4 is a longitudinal section of another form of the apparatus.
Figure 5:
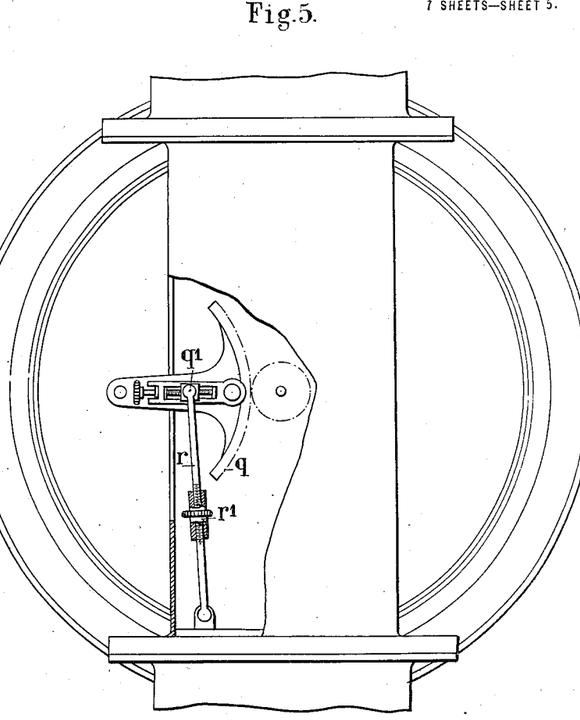
Fig. 5 is an elevation of a particular device for actuating the needle.

In the construction shown in Fig. 4 the apparatus comprises a cylinder $m$ provided at its opposite ends with chambers of variable volume $a$ and $b$. The movable walls of these chambers are each constituted by a rubber diaphragm $n$ secured to the face of a piston $n^1$ mounted on a common rod $o$ so that, as in the apparatus hereinbefore described, to any increase of volume of one of the chambers will correspond an equal decrease of the volume of the other chamber. $p$ is a helical spring coiled around the rod $o$ and secured thereto at one end at $o^1$ while its other end is attached to a stationary wall $m^1$ carried by the cylinder. This spring is designed so as to be in equilibrium (either when extended or compressed) with the differences of pressure existing between the chambers. The needle-controlling device consists of a sector $q$ provided with a sliding adjusting block $q^1$ actuated either by a wire or thread $q^2$ secured as at $n^2$ to the moving parts or by a two-part connecting rod $r$ (Fig. 5) whose length may be varied at will by means of a sleeve $r^1$ screwing on right and left handed threads carried by the two rods $r$ respectively. The latter construction enables the rapid adjustment of the needle to the zero on the scale. When it is desired to render the indicating dial quite independent of the actuating mechanism of the apparatus, the sleeve $r^1$ must be completely unscrewed to allow the separation of the two parts of the rod.

The apparatus last described possesses the advantage that, by using rubber diaphragms to obtain an air-tight joint, greater length of the stroke of the pistons may be obtained, thus further decreasing the causes of error due to the multiplying devices actuating the needle or recording pen.

Figures 6, 7:
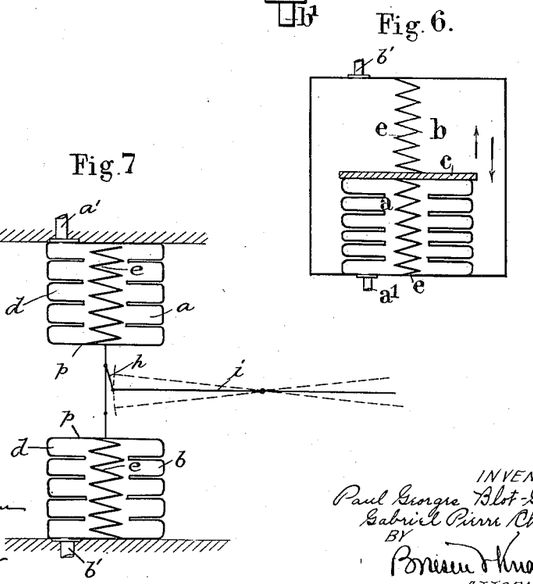
Figs. 6 to 9 illustrate schematically various constructions of the apparatus.

The apparatus may also be arranged as shown diagrammatically in Fig. 6, in which the deformable chamber $a$ is mounted within a rigid chamber $b$, in which case the movable wall $c$ is held in its normal position by two springs $e$ under tension and in opposition. The chambers are put into communication with the media of which it is desired to ascertain the difference of pressure, by conduits $a^1$ and $b^1$. As in the arrangement first described, any difference of pressure between the media will force the movable wall $c$ in the one or the other direction, the volume of the two chambers varying as before in relatively inverse relation. The needle or recording pen may be actuated by any suitable device similar to those already described.

Figure 8:
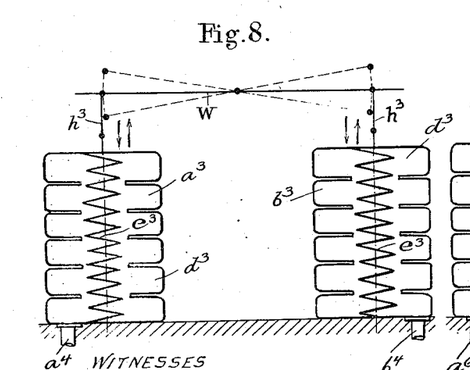

A diagrammatic exemplification of the apparatus is shown in Fig. 7, the arrangement of parts and functions thereof being similar to that shown in Fig. 1. Two chambers are represented in their entirety by $a$ and $b$ respectively and are each comprised of a plurality of capsules $d$. A link $h$ has one end secured to the lever $i$ and the other end secured to wall $p$. Conduits $a'$ and $b'$ are provided for the chambers $a$ and $b$ respectively. Springs $e$ are provided for each chamber and normally tend to maintain the wall $p$ in its initial position. In Fig. 8 which is a diagrammatic exemplification of a modification of the apparatus, the two chambers are represented by $a^3$ and $b^3$ and the capsules by $d^3$. Springs $e^3$ are provided for each chamber and actuate links $h^3$ which in turn actuate the lever $w$ which in this instance is pivoted between the two chambers. Conduits $a^4$ and $b^4$ are provided for each chamber.

Figure 9:
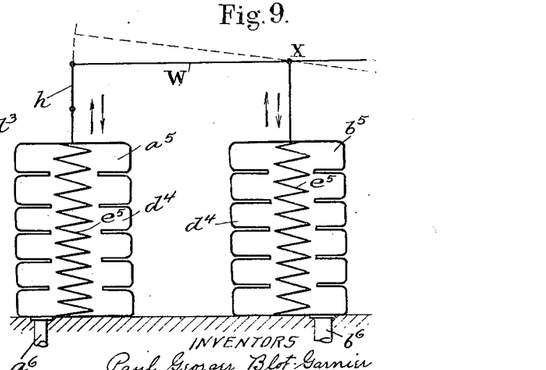

In Fig. 9 which represents a further modification of the invention, chambers $a^5$ and $b^5$ with the capsules $d^4$ are shown. Springs $e^5$ are provided for each chamber. The spring in the chamber $a^5$ is connected by means of a link $h$ to a lever $w$ while the spring in the chamber $b^5$ is directly connected to the lever $w$. The point of connection of the said spring and lever constituting the pivotal point of the lever $w$. Conduits $a^6$ and $b^6$ are provided for the chambers $a$ and $b$ respectively.

Figure 10:
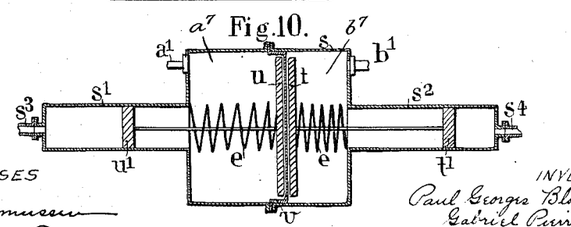
Fig. 10 is a diagram of a relay constructed according to the invention.
Figure 12:
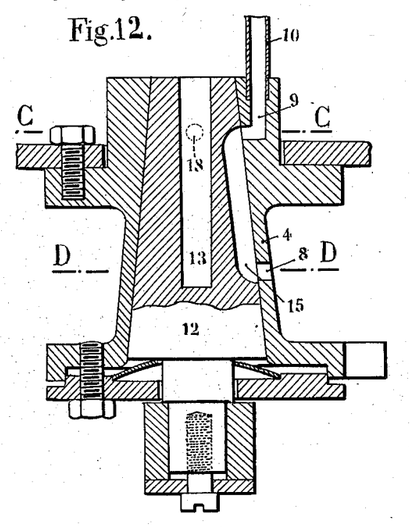

When the difference of pressure acting on the apparatus per unit of area is insufficient for actuating the indicating or recording device, use is made of a multiplying relay in which pressure is transmitted to the device by hydraulic means. This relay, which is designed on the same lines as some of the devices already described, comprises a large cylinder $s$ (see Fig. 10) within which are mounted two pistons $t$ and $u$ between which is held a rubber diaphragm $v$ for obtaining an air-tight joint, the pistons being held in their initial position by springs $e$ under tension. These pistons divide the cylinder into two chambers $a^7$ and $b^7$ of variable volume, which are put into communication (by means of conduits $a^1$ and $b^1$ respectively) with the media between which the difference of pressure is to be ascertained. To the ends of the large cylinders are secured smaller cylinders $s^1$ and $s^2$ in which slide pistons $t^1$, $u^1$ which are respectively secured to the larger pistons $t$ and $u$. The cylinders $s^1$ and $s^2$ are put into communication by means of conduits $s^3$ and $s^4$ with chambers $a$ and $b$ of an indicating or recording device or even manometric tubes. As will be seen, the difference of pressure per unit of area of the pistons $t$ and $u$ is multiplied by the ratio of the area of the large piston to the area of the smaller piston. The difference of pressure thus multiplied is preferably transmitted to the device by a hydraulic medium.

The chambers of the apparatus may be arranged in a manner different from those already described, Fig. 7 illustrating an arrangement in which the chambers, which are constituted by a plurality of capsules, are mounted in opposition, while in Figs. 8 and 9 the chambers are arranged in parallel position, the needle or recording pen controlling device being actuated either by the middle portion of a lever $w$ connecting together the movable walls of the two chambers (Fig. 8) or by an extension on said lever, in which case the lever is pivotally mounted as at $x$ on a rod carried by one of the moving walls.

All the arrangements above described apply whether the chambers are constituted by deformable capsules or are chambers provided with pistons, while the different arrangements might also be applied to the multiplying relay.

The dynamometrical arrangement employed in this device and constituted by the combination of two springs mounted in tension or compression and acting in opposition on a movable receiving surface, is applicable to all measuring devices depending for their action on the elasticity of metals, this arrangement affording great sensitiveness and stability in position of equilibrium.

Figure 13:
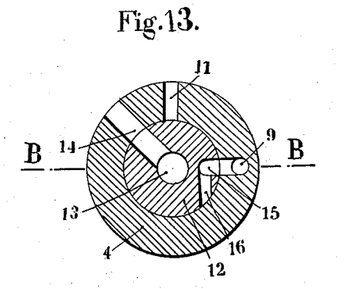
Figs. 13 and 14 are horizontal sections on lines C—C and D—D of Fig. 12 respectively.
Figures 14, 18:
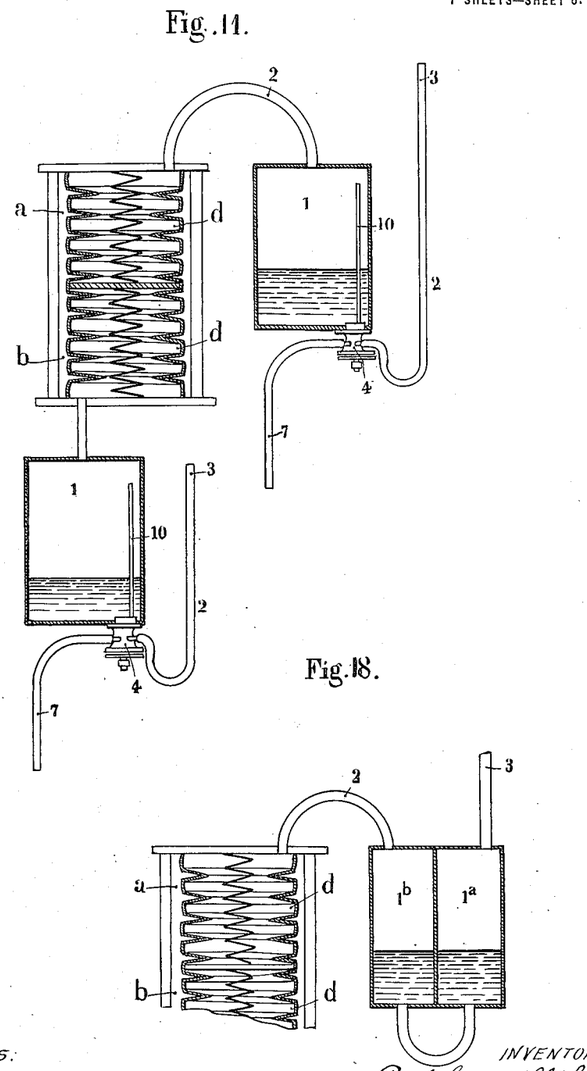
Fig. 18 is a vertical section of a modified construction of the safety device.
Figure 14:
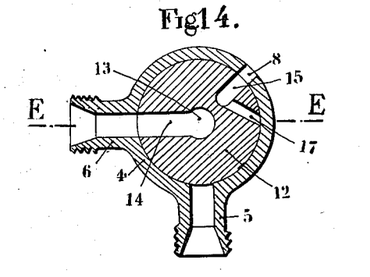
Figure 15:
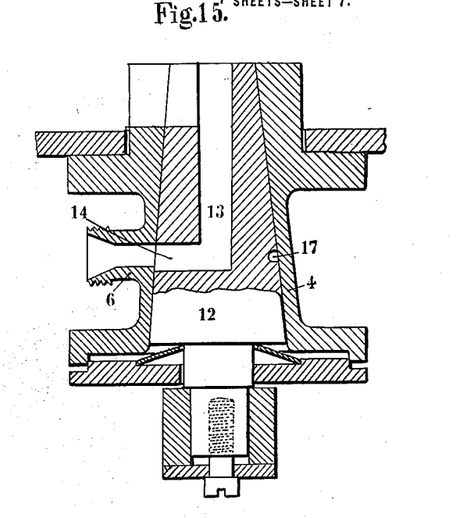
Fig. 15 is a section on line E—E, Fig. 14.
Figure 16:
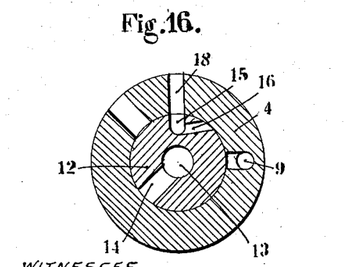
Figs. 16 and 17 are sections corresponding respectively to those shown by Figs. 13 and 14, showing the operation of the valve.
Figure 17:
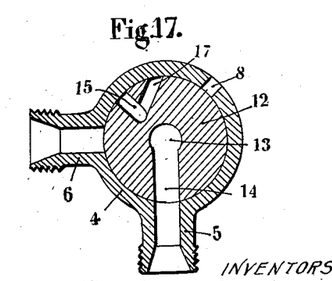

In the arrangement illustrated in Figs. 11 to 17, each of the deformable chambers of the indicating or recording instrument is provided with a safety device comprising a capacity 1 whose volume is substantially equal to the volume of the deformable chamber it is intended to protect. The capacity 1 corresponding to the upper deformable chamber is interposed in the middle branch of a double swan neck 2 whose open end is connected with the air conduit 3. The capacity appertaining to the lower deformable chamber may be connected in a similar manner or preferably as shown on the drawing beneath the chamber it is intended to protect. Each of the safety capacities 1 is provided at the point whereat the air conduit debouches therein with a purge cock of special construction. The body 4 of this cock is provided with two openings 5 and 6 to which are respectively connected the air delivery conduit 3 and the purge conduit 7, said body being furthermore provided with an air inlet port 8 and a passage 9 within which debouches a vertical tube 10 leading to the upper part of the capacity, the upper part of the valve body being also furnished with an opening 11 debouching into the lower part of the capacity 1. The plug for this valve is furnished with a central passage 13 adapted to put the lower part of the capacity 1 into communication, by means of a horizontal passage 14, either with the purge opening 6 or with the air inlet 5. The plug is furthermore provided on one side with a vertical slot 15 serving to establish communication, as shown in Figs. 13 and 14, between the port 8 in the valve body and the tube 10. At the ends of the vertical slot 15 terminate horizontal passages 16—17 intended to establish communication between the upper part of the capacity 1 and the atmosphere when the plug is turned through an angle of 45° from that position in which it is shown in Figs. 13 and 14, thus closing the air inlet 5 and purge tube 6. When the plug has been turned and brought to the position shown in Figs. 16 and 17, the capacity 1 is put into communication, by means of the passages 13—14, with the air inlet 5 and the slot 15 is in communication with the lower portion of the chamber through the opening 18 in the upper part of the valve body.

The operation of the safety device above described, assuming that at the time when the apparatus is in use it is actuated by the pressure of the wake of the vessel and that a leak takes place in the air conduit, is as follows:

Inasmuch as the air is no more in equilibrium with the pressure of the water, the latter passes in until it reaches the double swan's neck 2 and begins to pass into the chamber. As the air contained in the upper part of said chamber cannot escape through the lower conduit, it is then compressed in the upper bend and in the deformable chamber $a$ of the device and thus prevents the water from passing into said chamber. The device then works normally, the capacity 1 serving as a moderator. It is to be observed that at this time, as the slot 15 in the plug of the valve is in communication, through the opening 18, with the lower part of the chamber, it is full of water and constitutes a liquid sealed joint preventing all leakage of air should the valve be a badly fitting one.

In order to cut off all communication between the apparatus and the sea, the plug must be rotated through 45° clockwise from the position it then occupies. Finally, for expelling water from the chamber the plug must be brought to the position shown in the drawings. The water passes out through the conduit 6 while air is admitted to the upper part of the chamber through the port 8, the slot 15, the passage 9 and the tube 10.

The valve permits the supervision of the working of the apparatus and enables the user to ascertain whether the volume of air within the capacity has varied. It also enables the starting up again of the apparatus under the same conditions as initially.

The arrangement shown in Fig. 18 might be adopted in certain cases. In this arrangement the capacity is divided into two compartments $1^a$ and $1^b$ connected together at their lower part by means of a U-shaped tube, said tube and the lower part of each compartment being filled by a suitable liquid of density lighter than water (e. g. oil, glycerin). The two capacities are respectively in communication at their upper part, the one with the conduit and the other with the deformable chamber, so that should sea water accidentally gain access into the conduit and reach the capacity $1^a$, it will fill the U-shaped elbow piece and rise within the capacity $1^b$ until such time as the pressure of the air therein will be such that a condition of equilibrium is attained. As the capacity $1^b$ is of a volume sufficient relatively to the deformable chamber, the water cannot reach the latter. The advantage of this arrangement is that in case of accident a layer of liquid (oil or glycerin) is interposed between the sea water and the air contained in the apparatus.

It is to be understood that the arrangements above described are only given by way of example. The shapes, dimensions and arrangements of details may be varied as required without departing from the principle of the invention.

We claim:—

1. In an apparatus of the character described the combination of two chambers of variable capacity, a wall for said chambers, a spring with one end secured to one of the faces of said wall and the other end secured to the bottom of the accompanying chamber, a second spring with one end secured to the other face of said wall and with its other end secured to the bottom of the accompanying chamber, the said springs tending to maintain the wall in its initial position, means to actuate said wall by a liquid whose differential pressure is to be measured, an indicating needle in the apparatus and means for transmitting the movements of said wall to said indicating needle.

2. In an apparatus of the character described the combination of a plurality of chambers of variable capacity, a wall for the chambers, a spring having one end fastened to one face of said wall and the other end secured to the bottom of the accompanying chamber, a second spring with one end fastened to the opposite face of said wall and with its other end secured to the bottom of its accompanying chamber, the said springs tending to maintain the wall in its initial position, means to actuate said wall by a liquid whose differential pressure is to be measured, an indicating needle in the apparatus and means for transmitting the movements of said wall to said indicating needle.

3. In an apparatus of the character described the combination of two chambers of variable capacity, a movable wall for said chambers, a spring secured to one face of the said wall and the bottom of the accompanying chamber, the said spring tending to maintain the wall in its initial position, means to subject said wall to the differential pressure of a liquid to be measured, trunnions carried by said wall, a ring surrounding said wall and movable around said trunnions, links for said ring, arms secured to said links, one of said arms having an extension, recording means in the apparatus and a rod connecting the recording means and the arm with the extension.

4. In an apparatus of the character described the combination of two chambers of variable capacity, movable walls co-acting with said chambers, means to actuate said walls by liquids whose differential pressure is to be measured, means for restoring each of these chambers to its initial volume, two cylinders for the apparatus, a piston for each of said cylinders actuated by the movable wall, two chambers of variable capacity communicating with said cylinders with a fluid therein for transmitting the displacements of the pistons to the movable wall, an indicating needle in the apparatus, and means for transmitting the movements of the walls to the said indicating needle.

5. In an apparatus of the character described the combination of a cylinder, two pistons movably located in said cylinder and dividing said cylinder into two chambers of variable capacity, two springs, one for each of said pistons, the said springs tending to maintain the pistons in their initial position, means to actuate said pistons by a liquid whose differential pressure is to be measured, two small cylinders mounted respectively at the ends of said cylinder, pistons movable in the latter cylinders and actuated by the adjacent pistons of said cylinders, two chambers of variable capacity communicating respectively with the latter cylinders, having a transmitting fluid contained therein, an indicating needle in the apparatus and means for transmitting the displacements of the said pistons to the indicating needle.

PAUL GEORGES BLOT-GARNIER.
GABRIEL PIERRE CHEVALIER.

Witnesses:
De Witt C. Poole, Jr.,
T. A. Koski.